(12) United States Patent
Boiocchi et al.

(10) Patent No.: US 8,322,388 B2
(45) Date of Patent: Dec. 4, 2012

(54) ON/OFF-ROAD TIRE FOR A MOTOR VEHICLE

(75) Inventors: Maurizio Boiocchi, Milan (IT); Vito Bello, Milan (IT); Giuseppe Matrascia, Milan (IT); Stephen Rowe, Milan (IT)

(73) Assignee: Pirelli Tyre S.p.A., Milan (IT)

(*) Notice: Subject to any disclaimer, the term of this patent is extended or adjusted under 35 U.S.C. 154(b) by 906 days.

(21) Appl. No.: 11/791,280

(22) PCT Filed: Nov. 29, 2004

(86) PCT No.: PCT/EP2004/053160
§ 371 (c)(1),
(2), (4) Date: Mar. 11, 2009

(87) PCT Pub. No.: WO2006/056238
PCT Pub. Date: Jun. 1, 2006

(65) Prior Publication Data
US 2009/0199943 A1   Aug. 13, 2009

(51) Int. Cl.
*B60C 11/03* (2006.01)
*B60C 11/11* (2006.01)
(52) U.S. Cl. ............ 152/209.18; 152/209.22; 152/902; 152/903
(58) Field of Classification Search ............ 152/209.18, 152/209.22, 209.28, 902, 903; D12/594–597
See application file for complete search history.

(56) References Cited

U.S. PATENT DOCUMENTS

| | | | | |
|---|---|---|---|---|
| 5,725,700 A | * | 3/1998 | Ichiki | 152/209.18 |
| 6,311,748 B1 | * | 11/2001 | Boiocchi et al. | 152/209.2 |
| 6,343,636 B1 | * | 2/2002 | Hanya et al. | 152/209.24 |
| 7,416,003 B2 | * | 8/2008 | Yamane | 152/209.15 |
| 7,434,606 B2 | * | 10/2008 | Miyabe et al. | 152/209.2 |
| 2001/0017177 A1 | | 8/2001 | Himuro | |

FOREIGN PATENT DOCUMENTS

| | | | |
|---|---|---|---|
| EP | 0 506 279 A1 | | 9/1992 |
| EP | 0 704 324 A2 | | 4/1996 |
| EP | 0 841 198 A1 | | 5/1998 |
| JP | 07-132710 | * | 5/1995 |
| JP | 9-226323 | * | 9/1997 |
| WO | WO2004/050389 | * | 6/2004 |
| WO | WO2004/082965 | * | 9/2004 |

* cited by examiner

*Primary Examiner* — Steven D Maki
*Assistant Examiner* — Robert Dye
(74) *Attorney, Agent, or Firm* — Finnegan, Henderson, Farabow, Garrett & Dunner, L.L.P.

(57) ABSTRACT

A tire having a tread wherein a first shoulder region includes a plurality of shoulder blocks that are circumferentially separated by shoulder transverse grooves. A central region includes a plurality of substantially transverse grooves extending from a first circumferential groove toward the equatorial plane, wherein two circumferentially consecutive substantially transverse grooves delimit a central area. The central area includes a first central block; a second central block having one side forming a part of the wall of the first circumferential groove; and a third central block circumferentially shifted with respect to the first central block and positioned at a distance from the first circumferential groove, the third central block being separated from the second central block by a central transverse groove which is inclined with respect to the equatorial plane. The substantially transverse grooves have respective end portions at a distance from the equatorial plane.

34 Claims, 11 Drawing Sheets

ON/OFF-ROAD TIRE FOR A MOTOR VEHICLE

CROSS REFERENCE TO RELATED APPLICATION

This application is a national phase application based on PCT/EP2004/053160, filed Nov. 29, 2004, the content of which is incorporated herein by reference.

BACKGROUND OF THE INVENTION

1. Field of the Invention

The present invention relates to a tire for a motor vehicle, in particular to a pneumatic tire whose tread pattern provides excellent off-road and on-road performance.

2. Description of the Prior Art

In the present specification, the term "all terrain" tire will be used for indicating a tire for both a two or four wheel drive motor vehicle to be used, according to circumstances, on asphalted roads as well as on non-asphalted roads (e.g. on snow- or mud-covered roads, or on grassy, sandy or gravelly surfaces).

Generally, off-roads vehicles are designed for pure and extreme off-road, for instance for driving on rough surfaces, on snow-covered roads, on muddy or sandy surfaces.

In the last years, all terrain motor vehicles (particularly four wheel drive, briefly "4×4"), i.e. vehicles which combine off-road and on-road performance, have become more and more popular and at present their versatility is highly appreciated by the market. Among such all terrain vehicles are, for instance, the PICK-UPs as well as the so called SUVs (Sport Utility Vehicles) which combine the characteristics of comfort and roominess typical of a station wagon with high performance (especially in terms of high torques and high speeds) typical of high-powered cars.

The overall performance of pneumatic tires to be mounted on all terrain motor vehicles is a peculiar issue of the tire manufacturers and very difficult to be achieved. In fact, the drivers of said vehicles ask for tires providing both good off-road performance and good on-road handling properties, while ensuring that low noise level and good wear resistance are obtained.

However, these requirements are mainly conflicting each other. Therefore, the tires which have been produced to date normally represent a compromise of the required performance mentioned above and do not reach the highest performance levels which can be obtained with a tire specifically designed for on-road or off-road use only.

Generally, a tread pattern is provided with large and deep circumferential grooves for discharging the water collected in the tire foot-print area in order to avoid the occurrence of the well-Known and hazardous aquaplaning effect while running on wet surfaces. On the contrary, in tires specifically designed for driving on dry surfaces, the number and width of longitudinal and transverse grooves is preferably reduced in order to increase the tread wear resistance, to reduce the tread noise level during running of the tire and to provide a smooth ride.

Furthermore, for safe and good driving on snow-covered surfaces, a tread pattern is generally provided with a plurality of sipes and small notches in order to suitably trap the snow since the snow-on-snow friction is greater than the rubber-on-snow friction.

Moreover, it is generally known to provide a tread pattern with a plurality of shoulder and central blocks in order to increase the tire off-road performance while running on uneven surfaces, e.g. on rough roads.

A tire for off-road motor vehicles is known, for instance, from EP 0 841 198 in the name of the same Applicant of the present application. The tire tread band according to EP 0 841 198 comprises: at least two longitudinal grooves substantially parallel to each other and extending circumferentially on opposite sides of the tire equatorial plane; at least one series of transverse grooves crossing the longitudinal grooves, said transverse and longitudinal grooves delimiting at least two rows of shoulder blocks circumferentially distributed at the opposite side edges, and at least one row of central blocks disposed between said rows of shoulder blocks, each of said transverse grooves comprising at least two transverse channels which mutually meet to give said transverse groove an axially continuous course extending between opposite side edges of the tread band. Each of said transverse channel comprises: an outer end stretch extending from the respective side edge of the tread band in an orientation substantially perpendicular to the equatorial plane; a curvilinear connecting stretch that, by joining to the corresponding curvilinear connecting stretch of the laterally-opposite transverse channel, gives said transverse groove said continuous course. At least one of said transverse channels further comprises an inner end stretch penetrating into a respective block of said central blocks, said connecting stretch interconnecting said outer end stretch with said inner end stretch in a continuity relationship.

SUMMARY OF THE INVENTION

The Applicant has perceived the need of providing a tread pattern which combines off-road and on-road properties to satisfy the increasing request from: the market of tires for all terrain motor vehicles.

In particular, the Applicant has perceived the need of providing an on-road and off-road tread pattern which results in improved on-road performance, principally in terms of decreased noise level and improved wear resistance while maintaining good on-road tractivity and handling performance both on dry and wet roads, as well as good off-road performance.

The Applicant has found that an improved tire for on-road and off-road use can be obtained by providing a tread pattern which comprises a first and a second circumferential grooves that separate a central region from a first and second shoulder regions, wherein the first shoulder region comprises a plurality of shoulder blocks that are circumferentially separated by shoulder transverse grooves and wherein said central region comprises a plurality of substantially transverse grooves extending from said first circumferential groove towards an equatorial plane of the tire. Two circumferentially consecutive substantially transverse grooves delimit a central area comprising: a first central block having one side forming a part of a wall of said first circumferential groove; a second central block, circumferentially consecutive to said first central block, having one side forming a part of said wall of said first circumferential groove; and a third central block, circumferentially shifted with respect to said first central block and positioned at a distance from said first circumferential groove, said third central block being separated from said second central block by a central transverse groove which is inclined with respect to the tire equatorial plane. Said substantially transverse grooves have respective end portions at a distance from the tire equatorial plane.

Preferably, the central transverse groove forms an angle, with respect to a radial plane, which is greater than 90° and lower than 180°. More preferably, the angle is from about 130° to about 170°.

According to one embodiment, the central transverse groove is substantially straight.

According to another embodiment, the central transverse groove is elbow shaped.

Preferably, the central area comprises a further central transverse groove between the first central block and the second central block.

According to one embodiment, the further central transverse groove is substantially straight and parallel to the central transverse groove.

According to another embodiment, the further central transverse groove is elbow shaped.

Profitably, the substantially transverse grooves comprise a first end portion in correspondence of said first circumferential groove.

Profitably, the substantially transverse grooves comprise a second end portion at a distance from the equatorial plane.

Preferably, the substantially transverse grooves, in correspondence of said second end portions are substantially tangent to a plane parallel to said equatorial plane.

Preferably, the substantially transverse grooves have a width decreasing from the first end portion towards the second end portion.

Preferably, the substantially transverse grooves have a depth decreasing from the first end portion towards the second end portion.

Preferably, the central area comprises a further substantially transverse groove at least partially penetrating into said second central block.

The central region preferably comprises a plurality of first equatorial blocks and second equatorial blocks, the first and second equatorial blocks being arranged in circumferential succession substantially in proximity of the equatorial plane.

Preferably, the first and second circumferential grooves have a zig-zag path.

Preferably, the substantially transverse grooves are substantially axially aligned with corresponding shoulder transverse grooves and the further substantially transverse grooves are substantially axially aligned with corresponding shoulder transverse grooves.

Further features and advantages will become more apparent from the detailed description of preferred but non-exclusive embodiments of a tire, in particular for on-road and off-road motor vehicles, in accordance with the present invention. The present description should be taken with reference to the accompanying drawings, given by way of non limiting example.

BEST MODE FOR CARRYING OUT THE INVENTION

The structure of a tire according to the present invention is of a conventional type and comprises a carcass, a tread band located on the crown of said carcass, a pair of axially superimposed sidewalls terminating in beads, reinforced with bead cores and corresponding bead fillers, for securing said tire to a corresponding mounting rim. The carcass comprises one or more carcass plies which are associated to said bead cores.

A tire generally further comprises a belt structure interposed between the carcass and the tread band, said belt structure preferably comprising two belt layers, usually including metal cords that are parallel to each other in each layer and crossing over those of the adjacent layers. The metal cords in each layer are symmetrically inclined with respect to the tire equatorial plane. Preferably, the belt structure also comprises a third belt layer, in a radially outermost position, which is provided with rubberized cords, preferably textile cords, that are oriented circumferentially, i.e. with a disposition at substantially zero degrees with respect to the tire equatorial plane.

Figure 1:
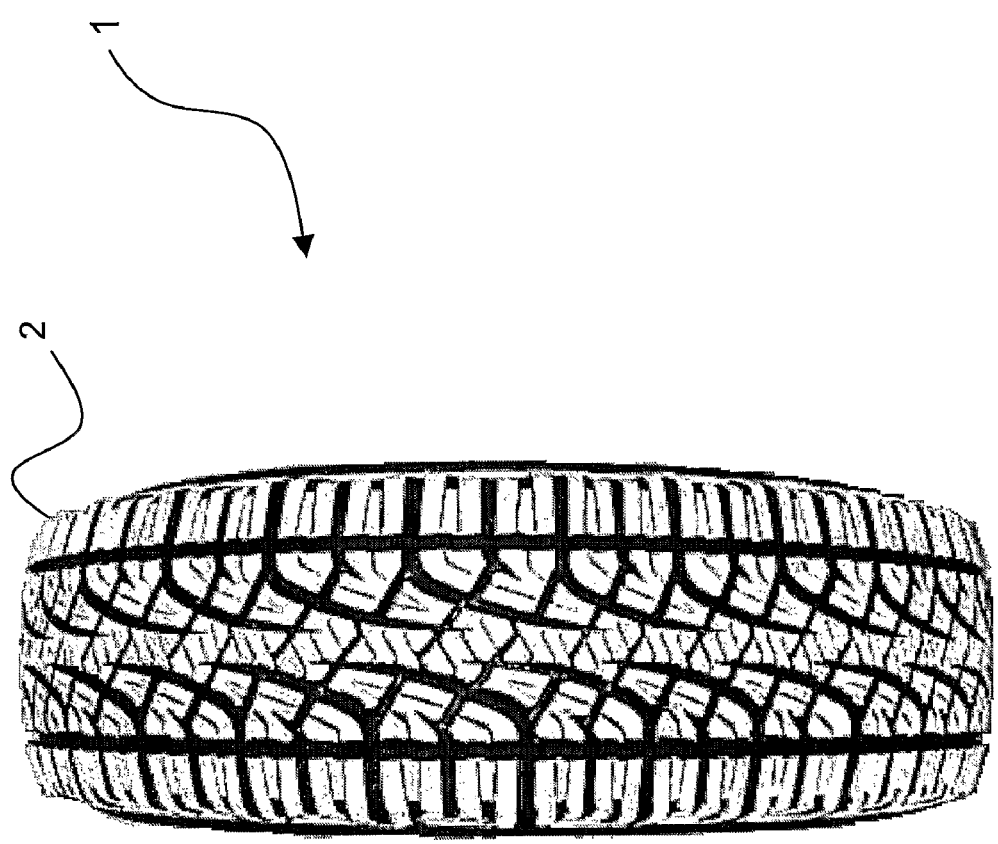
FIG. 1 is a perspective view of a tire with a tread band according to a first embodiment of the present invention.
Figure 2:
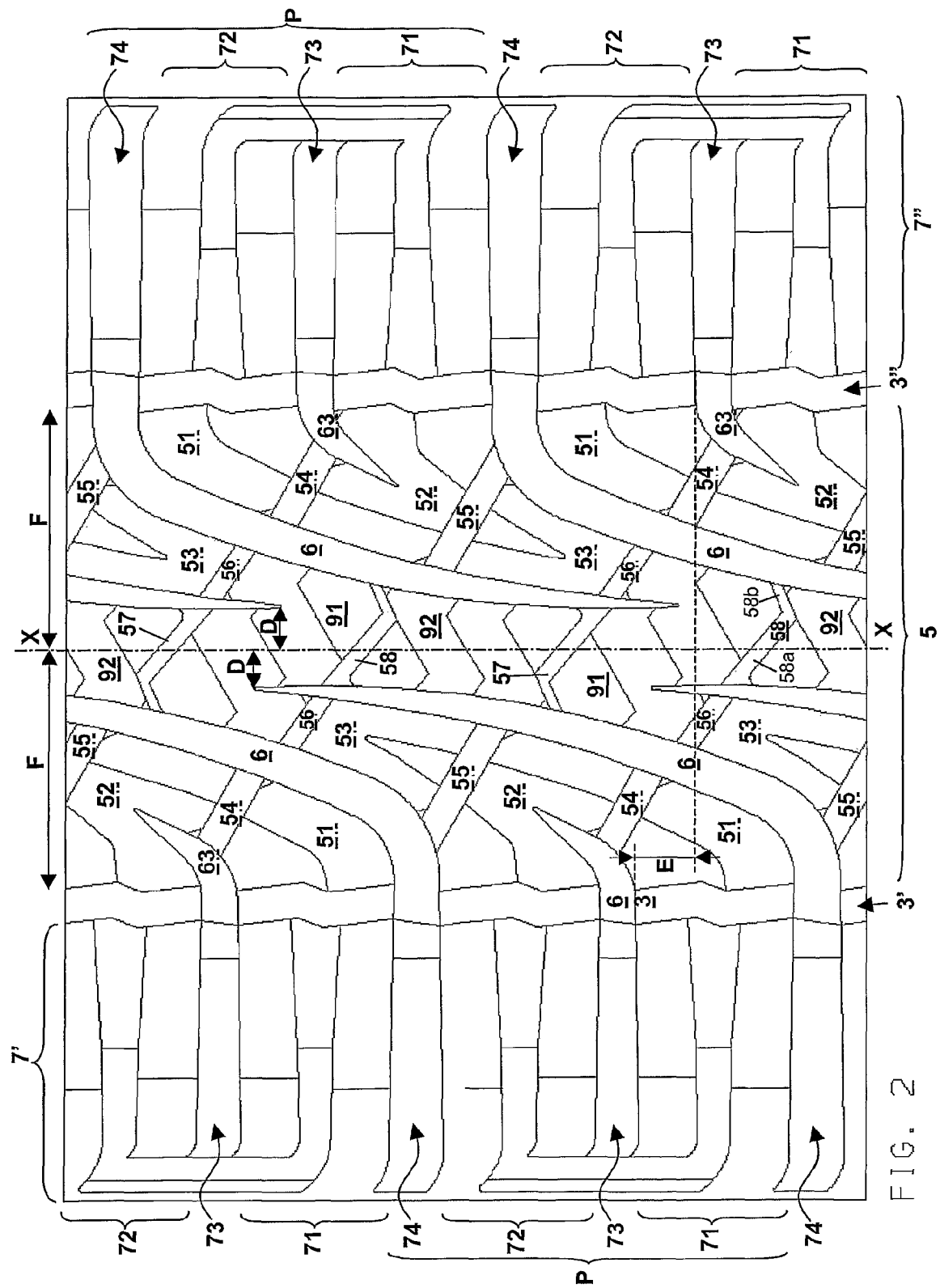
FIGS. 2 and 2a are plan views of a portion of a tread band of a tire in accordance with the first embodiment of the present invention.
Figure 2A:
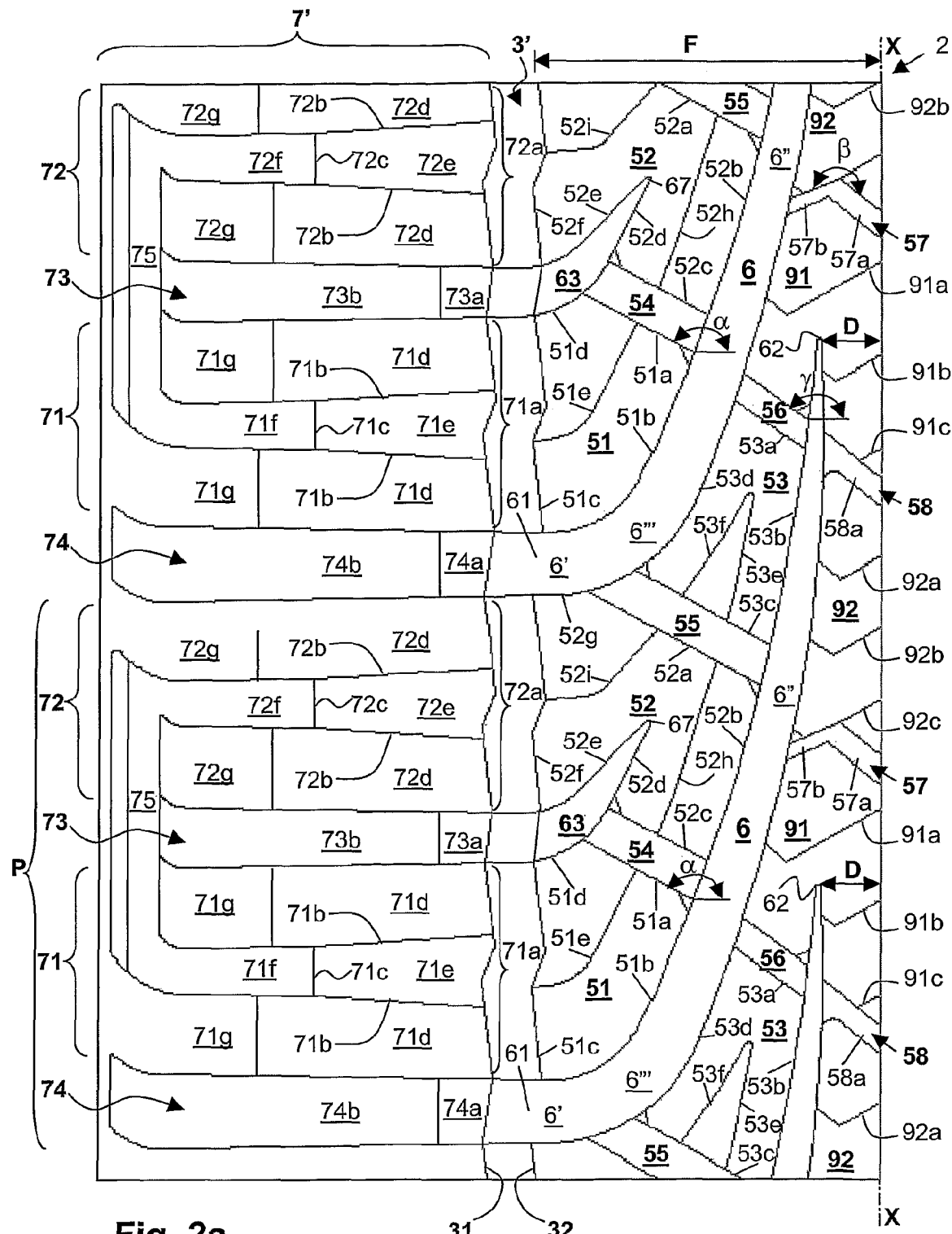

FIG. 1 is a perspective view of a tire 1 with a tread band according to a first embodiment of the present invention. A plan view of a portion of a tread band 2 of the tire of FIG. 1 is shown in FIGS. 2 and 2a. According to said first embodiment, tread band 2 is of the symmetric type, i.e. it does not have a preferential rolling direction and does not provide any constraints as regards the (inner/outer) mounting side of the tire on the vehicle.

Tread 2 is provided with a first circumferential groove 3' and a second circumferential groove 3" that define a central region 5 and two shoulder regions, respectively a first shoulder region 7' and a second shoulder region 7". In details, the central region 5 is the tread portion defined between said first and second circumferential grooves 3', 3", while the two shoulder regions 7', 7" are defined at the axially outer side of said first and second circumferential grooves 3', 3", respectively. Tread 2 further comprises an equatorial plane X-X.

According to the present invention, circumferential grooves 3', 3" are principally provided in order to confer longitudinal flexibility to the tread as well as to ensure water or sand discharging from the tire foot-print area while running-on wet or sandy surfaces, respectively. Circumferential groove 3' has a depth ranging from about 8.0 mm to about 15.0 mm and a width ranging from about 4.0 mm to about 10.0 mm.

Moreover, preferably, circumferential grooves 3', 3" are provided with a substantially zig-zag path so as to increase the lateral rigidity of the tire (thanks to the transverse portions of said zig-zag path) and to avoid the so called "groove wander" phenomenon which occurs in case the circumferential grooves of the tire coincide with longitudinal grooves that are provided on some road surfaces for discharging water therefrom.

Hereinbelow, a detailed description of tread 2 of the tire according to the first embodiment of the present invention is given by starting from the left side thereof and with reference to FIG. 2a which represents the left side portion of the tread 2 of FIG. 2.

Shoulder region 7' comprises a plurality of circumferentially consecutive shoulder blocks 71, 72. Shoulder blocks 71, 72 are separated from each other by shoulder transverse grooves 73, 74. Preferably, shoulder transverse grooves 73, 74 are circumferentially alternated between circumferentially consecutive shoulder blocks 71, 72. Preferably, shoulder transverse grooves 73, 74 are substantially parallel to a radial plane of the tire. According to FIGS. 2 and 2a, shoulder blocks 71, 72 have a substantially rectangular shape.

Axially inner (i.e. closer to the tire equatorial plane) longitudinal sides 71a, 72a of shoulder blocks 71, 72, respectively, face the circumferential groove 3'. In other words, the succession in the circumferential direction of consecutive shoulder blocks 71, 72—and in particular the succession in the circumferential direction of sides 71a, 72a of said blocks 71, 72—forms the axially outermost lateral wall 31 of the circumferential groove 3'.

As mentioned above, preferably circumferential groove 3' is provided with a substantially zig-zag path. This means that lateral wall 31 has a substantially zig-zag course which is interrupted in correspondence of shoulder transverse grooves 73, 74 that intersect the circumferential groove 3'.

The block and groove assembly P between two circumferentially consecutive shoulder transverse grooves 74 is termed "shoulder pitch". Thus, a shoulder pitch P comprises a first and a second circumferentially consecutive shoulder blocks 71, 72 and a first and a second shoulder transverse grooves 73, 74. Preferably, P is a number comprised between twenty-eight and thirty-five.

In a preferred embodiment, P is thirty. This results in a tread pattern 2 provided with thirty shoulder blocks 71, thirty shoulder blocks 72 and thirty grooves 73, 74.

According to the embodiment shown in FIG. 2a, shoulder block 71 comprises two sipes 71b converging to a longitudinally extending wall 71c. Sipes 71b start from lateral wall 31 and, in combination with wall 71 and a portion of side 71a, they delimit a central shoulder block portion 71e. Said central shoulder block portion 71e is substantially flanked by two lateral shoulder block portions 71d which are located upstream and downstream (while considering a circumferential direction), respectively, of said central shoulder block portion 71e. The two lateral shoulder block portions 71d project towards the tire sidewall by means of respective block projections 71g.

In FIG. 2a, reference number 71f denotes a first transverse groove which is positioned between two circumferentially consecutive block projections 71g.

Similarly to shoulder block 71, shoulder block 72 comprises two sipes 72b converging to a longitudinally extending wall 72c. Sipes 72b start from lateral wall 31 and, in combination with wall 72c and a portion of side 72a, they delimit a central shoulder block portion 72e. Said central shoulder block portion 72e is substantially flanked by two lateral shoulder block portions 72d which are located upstream and downstream (while considering a circumferential direction), respectively, of said central shoulder block portion 72e. The two lateral shoulder block portions 72d project towards the tire sidewall by means of respective block projections 72g.

It can be noted that, according to the present invention, shoulder blocks 71, 72 are provided with sipes 71b, 72b in order to increase the tire tractivity as well as to decrease the tread noise level in correspondence of the tire shoulder regions 7', 7''.

In FIG. 2a, reference number 72f denotes a second transverse groove which is positioned between two circumferentially consecutive block projections 72g.

A connecting groove 75 is further provided for connecting first and second transverse grooves 71f, 72f.

Preferably, transverse grooves 73 of first shoulder region 7' comprise a first portion 73a, having a first depth, and a second portion 73b, having a second depth. First portion 73a and second portion 73b are axially adjacent to each other. Preferably, the second depth is greater than the first depth.

Similarly, transverse grooves 74 of first shoulder region 7' preferably comprise a first portion 74a, having a first depth, and a second portion 74b, having a second depth. First portion 74a and second portion 74b are axially adjacent to each other. Preferably, the second depth is greater than the first depth.

Preferably, the depth of transverse grooves 73, 74 ranges from about 4.0 to about 7.5-mm at first portions 73a, 74a. Preferably, the depth of transverse grooves 73, 74 ranges from about 8.0 to about 15.0 mm at second portions 73b, 74b.

Preferably, the width of transverse grooves 73, 74 substantially increases from longitudinal groove 3' going towards the sidewall. Preferably, the width of transverse groove 73 ranges from about 6.0 to about 13.0 mm and the width of transverse groove 74 ranges from about 6.0 to about 15.0 mm.

In the present description, the depth of a groove is measured by means of three planes "a", "b" and "c" (not shown). Plane "a" is a plane intersecting the groove bottom; said plane "a" being perpendicular to a plane "b" tangent to the groove bottom and to a plane "c" which is parallel to "b" and substantially closes the groove on the top. Thus, the depth of a groove is given by the distance, measured on plane "a", between the intersecting line of planes "a" and "b" and the intersecting line of planes "a" and "c".

In the present description, the width of a groove is measured with respect to a plane perpendicular to the groove walls, said measure being performed in correspondence of the tread rolling surface.

According to the present invention, transverse grooves 73, 74 are provided with the above mentioned portions (73a, 73b; 74a, 74b) having different depths in order to reduce the noise level of the tread pattern in correspondence of the shoulder regions and, moreover, to provide said regions with improved longitudinal rigidity. In fact, first portions 73a and 74a act as "joining portions" between shoulder blocks 71 and 72, thus avoiding excessive deformation of the shoulder region 7' in the tire footprint area, this resulting in an advantageous increase of the tire tractivity.

Moreover, it can be pointed out that shoulder regions 7', 7'' of the tire of the present invention remarkably improve the tire tractivity and braking performance thereof thanks to the presence of said deep transverse grooves 73, 74 (together with respective portions 73a, 73b and 74a, 74b) which provide the tread with robust and massive blocks.

Furthermore in order to improve the off-road performance of the tire of the present invention, the tread shoulder regions are provided with important block portions also in correspondence of the outermost ends of the shoulder region 7'. In fact, connecting grooves 75, in combination with block projections 71g, 72g and with first and second transverse grooves 71f, 72f of shoulder blocks 71, 72, respectively, provide the tire with an advantageous "toothed wheel effect" resulting in an additional mechanical traction. In other words, the presence of block areas which extend towards the tire sidewall contributes in increasing the tire grip, and thus the advancing thereof, when the tire is running on uneven surfaces, especially on a loose surface.

Central region 5 of the left portion of tread 2 will now be described in details.

Central region 5 comprises a plurality of substantially transverse grooves 6 extending from first circumferential groove 3' towards tire equatorial plane X-X.

Each substantially transverse groove 6 has two end portions 61, 62. In details, end portion 61 is located in correspondence of circumferential groove 3'—so that the substantially transverse groove 6 communicates with circumferential groove 3'—while end portion 62 is located in proximity of the equatorial plane X-X. Preferably, the substantially transverse grooves 6 do not cross the equatorial plane X-X. Preferably, the tip of end portion 62 is at a distance D of about 15-20% of a distance F between equatorial plane X-X and the wall 32 of longitudinal groove 3', said wall 32 being opposite to wall 31. A suitable range for D is from about 8.0 to about 15.0 mm.

As it is shown in FIG. 2a, each substantially transverse groove 6 comprises: 1) a first portion 6', which is located in correspondence of end portion 61, said first portion 6' being substantially rectilinear and transversely directed with respect to a tire rolling direction; 2) a second portion 6", which is slightly curved and terminates substantially tangential to a plane parallel to the tire equatorial plane X-X, and 3) a third portion 6''', which curvedly connects first portion 6' to second portion 6". Preferably, the width of the substantially transverse grooves 6 decreases from end portion 61 to end portion 62. Preferably, the width of the substantially transverse groove 6 at end portion 61 is comprised from about 6.0 mm to about 15.0 mm. Preferably, end portion 62 is tapered and thus the width of the substantially transverse groove 6 at end portion 62 is substantially null. Preferably, the depth of substantially transverse grooves 6 is substantially constant along its length and goes to zero in correspondence of the end portion 62. A preferable depth range for groove 6 is from about 8.0 mm to about 15.0 mm.

Preferably, end portions 61 of the substantially transverse grooves 6 are substantially axially aligned with shoulder transverse grooves 74. In other words, transverse grooves 74 and transverse grooves 6 preferably intersect circumferential groove 3' at the same longitudinal locations so that transverse grooves 74 define a portion of lateral wall 31 of circumferential groove 3' and transverse grooves 6 define a portion of the further lateral wall 32 of circumferential groove 3'. Preferably, the number of the substantially transverse grooves 6 is comprised from about twenty-eight to about thirty-five, more preferably is of thirty.

According to the embodiment of the present invention shown in FIG. 2a, central region 5 is provided with a plurality of further substantially transverse grooves 63. Preferably, each further substantially transverse groove 63 is located between two circumferentially consecutive transverse grooves 6. Preferably, the number of said further substantially transverse grooves 63 is equal to the number of said substantially transverse grooves 6.

Preferably, further substantially transverse grooves 63 are connected to circumferential groove 3' and intersect the latter in correspondence of shoulder transverse grooves 73. In details, further substantially transverse grooves 63 are substantially axially aligned with shoulder transverse grooves 73. In other words, shoulder transverse grooves 73 and transverse grooves 63 preferably intersect circumferential groove 3' at the same longitudinal locations so that shoulder transverse grooves 73 define a portion of lateral wall 31 of circumferential groove 3' and transverse grooves 63 define a portion of lateral wall 32 of circumferential groove 3'.

Preferably, further substantially transverse grooves 63 are shorter (i.e. longitudinally less extended) than the substantially transverse grooves 6.

Further substantially transverse grooves 63 terminate with an end portion 67. Preferably, end portion 67 is tapered, i.e. the depth of substantially transverse groove 63 is null in correspondence of end portion 67. The width of further substantially transverse groove 63 ranges from about 6.0 mm to about 15.0 mm; its depth ranges from about 5.0 mm to 15.0 mm.

According to the embodiment shown in FIG. 2a, a central area is provided between two circumferentially consecutive substantially transverse grooves 6, said central area comprising a first, a second and a third central blocks 51, 52 and 53, respectively, that will be described separately hereinbelow.

First central block 51 is delimited by grooves 54, 6, 3' and 63, and comprises four sides 51a, 51b, 51c and 51d, respectively. In details, side 51a is formed by a wall of a first central transverse groove 54 which connects further substantially transverse groove 63 with the substantially transverse groove 6. Preferably, said first central transverse groove 54 is substantially perpendicular to second portion 6" of transverse groove 6. Preferably, first central transverse groove 54 is inclined—with respect to a radial plane—of an angle α which is comprised from about 130° to about 170°.

In the present description, each angle—which is used to indicate the inclination of a given tread pattern element—is intended to be calculated as the angle defined between a radial plane of the tire and the plane said given tread pattern element belongs to, said angle being obtained by a clockwise rotation of the plane of the given tread pattern element towards the radial plane of the tire.

The width of first central transverse groove 54 is preferably comprised from about 5.0 mm to about 10.0 mm. The depth of first central transverse groove 54 is preferably comprised from about 8.0 mm to about 15.0 mm.

Side 51b of first central block 51 is formed by a portion of a wall of the substantially transverse groove 6.

Side 51c of first central block 51 is formed by a portion of wall 32 of first circumferential groove 3'.

Side 51d of first central block 51 is formed by a portion of a wall of further substantially transverse groove 63.

First central block 51 is preferably provided with a first sipe 51e extending from side 51a to side 51c. Preferably, first sipe 51e is substantially parallel to the substantially transverse groove 6. Preferably, the connecting edge between sides 51a and 11b is chamfered.

Second central block 52 is delimited by grooves 55, 6, 54, 63 and 3', and comprises seven sides 52a, 52b, 52c, 52d, 52e, 52f and 52g, respectively. In details, side 52a is formed by a wall of a second central transverse groove 55 which connects two circumferentially consecutive transverse grooves 6. Second central transverse groove 55 is inclined with respect to the tire equatorial plane. Preferably, said second central transverse groove 55 forms an angle, with respect to a radial plane, that is greater than 90° and lower than 180°. Preferably, said second central transverse groove 55 is parallel to the corresponding first central transverse groove 54 belonging to the same central area. This means that first and second central transverse grooves 54, 55 belonging to the same pitch P are parallel, i.e. second central transverse groove 55 is inclined—with respect to a radial plane—of angle α defined above, wherein angle α is comprised from about 130° to about 170°.

The width of second central transverse groove 55 is preferably comprised from about 5.0 mm to about 10.0 mm. The depth of second central transverse groove 55 is preferably comprised from about 8.0 mm to about 15.0 mm.

Side 52b of second central block 52 is formed by a portion of a wall of the substantially transverse groove 6.

Side 52c of second central block 52 is formed by a wall of first central transverse groove 54.

Sides 52d and 52e of second central block 52 are formed by portions of the walls of the further substantially transverse groove 63, the latter penetrating into second central block 52.

Side 52f of second central block 52 is formed by a portion of wall 32 of first circumferential groove 3'.

Side 52g of second central block 52 is formed by a portion of a wall of a circumferentially consecutive transverse groove 6.

Preferably, second central block 52 is provided with a second and a third sipes 52h, 52i, respectively. Preferably, sipe 52h is substantially straight and parallel to side 52b. Preferably, sipe 52i is substantially curved and substantially parallel to side 52e.

Preferably, the connecting edge between sides 52a and 52b, as well as the connecting edge between sides 52c and 52d, are chamfered.

Third central block 53 is delimited by grooves 56, 6 and 55, and comprises four sides 53a, 53b, 53c and 53d, respectively. In details, side 53a is formed by a wall of a third central transverse groove 56 which connects two circumferentially consecutive transverse grooves 6. Said third central transverse groove 56 is inclined by an angle γ ranging from about 125° to about 165°.

The width of third central transverse groove 56 is preferably comprised from about 2.0 mm to about 6.0 mm. The depth of third central transverse groove 56 is preferably comprised from about 8.0 mm to about 15.0 mm.

Side 53b of third central block 53 is formed by a portion of a wall of a substantially transverse groove 6.

Side 53c of third central block 53 is formed by a wall of second central transverse groove 55.

Side 53d of third central block 53 is formed by a portion of a wall of a circumferentially consecutive transverse groove 6.

Preferably, third central block 53 is provided with a fourth sipe 53e and a fifth sipe 53f. Preferably, sipes 53e and 53f start at second central transverse groove 55 and connect in a point inside third central block 53.

The above arrangement of central blocks 51, 52, 53 and inclined central transverse grooves 54, 55 and 56 results in a very good performance of the tire in terms of noise level. In fact, according to this arrangement two blocks (i.e. 71, 72) in the shoulder area and two blocks (i.e. 51, 52) in the axially outer area of the central region converge to a single block (i.e. 53) in the axially inner area of the central region. This aspect is particularly advantageous since the noise level can be divided in two different frequency spectra and thus the average noise level is: remarkably reduced.

Before describing in detail the area of central region 5 in proximity of the equatorial plane X-X, it can be pointed out that, according to the embodiment shown in FIG. 2, the right side—with respect to said equatorial plane—of the tread of the tire according to the present invention is substantially similar to the left side of the tire tread described hereinabove.

In details, the right side of the tread is obtained by: 1) mirroring the tread left side with respect to the equatorial plane X-X (i.e. rotating the tread left side of 180° about the equatorial plane); 2) rotating the so, obtained mirror image of 180° about a tire rotational axis, and 3) shifting the rotated image of a predetermined distance so that the left and right side tread portions are staggered from each other. A suitable staggering distance E is comprised between about 10% and about 40% of shoulder pitch P. Preferably, E is about 25% of pitch P. Therefore, a detailed description of the tread right side will not be given.

In proximity of the tire equatorial plane X-X, central region 5 is provided with a substantially continuous rib that longitudinally extends astride the equatorial plane and axially extends between circumferentially consecutive transverse grooves 6 of the tread left side and circumferentially consecutive transverse grooves 6 of the tread right side. According to the present invention, said substantially continuous rib (free of longitudinal grooves) present in the tread central region contributes in increasing the wear resistance of the tire and in particular it avoids the occurrence of an irregular wear localized in the area in proximity of the equatorial plane. This advantageous feature is due to the absence of a "point of flexing" possibly generated when an equatorial longitudinal groove is provided.

According to a preferred embodiment of the present invention, the substantially continuous rib comprises a plurality of first equatorial blocks 91 and second equatorial blocks 92 that are arranged in circumferential succession. Preferably, the substantially continuous rib is obtained by circumferentially and consecutively alternating a first equatorial block 91 and a second equatorial block 92, said blocks being separated from each other by transverse equatorial grooves as described in details in the following of the present description.

Preferably, first equatorial block 91 has a substantially rhomboid shape. Preferably, first equatorial block 91 is penetrated by end portions 62 of two axially adjacent substantially transverse grooves 6 belonging to the tread left side and to the tread right side, respectively.

According to the embodiment shown in FIGS. 2 and 2a, first equatorial block 91 is delimited by: 1) two third central transverse grooves 56, which belong to the tread left and right sides and define a portion of the transverse edges of said block; 2) two intermediate portions of axially adjacent substantially transverse grooves 6 to define the substantially longitudinal edges of said block, and 3) a first transverse equatorial groove 57 and a second transverse equatorial groove 58, said equatorial grooves defining the remaining portions of the transverse edges of said block.

Preferably, first transverse equatorial groove 57 is elbow shaped and comprises a first portion 57a and a second portion 57b which intersect to form said elbow shape.

Preferably, first portion 57a is wider than second portion 57b. Preferably, the width of first portion 57a is comprised from about 2.0 mm to about 6.0 mm. Preferably, first portion 57a crosses the equatorial plane X-X Preferably, first portion 57a is aligned with third central transverse groove 56 and has the same width thereof. Preferably, first portion 57a is inclined, with respect to a radial plane of the tire, of the above mentioned angle γ. Preferably, the width of second portion 57b is comprised from about 1.5 mm to about 5.0 mm. Preferably, first portion 57a and second portion 57b form an angle β which is comprised from about 200° to about 240°. Preferably, first transverse equatorial groove 57 has depth comprised from about 8.0 mm to about 15.0 mm. Preferably, the depth of first transverse equatorial groove 57 is substantially constant along the extension thereof.

Preferably, second transverse equatorial groove 58 is elbow shaped and comprises a first portion 58a and a second portion 58b which intersect to form said elbow shape.

Preferably, first portion 58a is wider than second portion 58b. Preferably, the width of first portion 58a is comprised from about 2.0 mm to about 6.0 mm. First portion 58a crosses the equatorial plane X-X. Preferably, first portion 58a is aligned with third central transverse groove 56 and has the same width thereof. Preferably, first portion 58a is substantially parallel to first portion 57a. Preferably, the width of second portion 58b is comprised from about 1.5 mm to about 5.0 mm. Preferably, second portion 58b is parallel to second portion 57b. Preferably, second transverse equatorial groove 58 has a depth comprised from about 8.0 mm to about 15.0 mm. Preferably, the depth of second transverse equatorial groove 58 is substantially constant along the extension thereof.

According to the embodiment shown in FIGS. 2 and 2a, first equatorial block 91 comprises a plurality of sipes which are substantially transverse to the rolling direction. In details, first equatorial block 91 comprises: a sixth sipe 91a, a seventh sipe 91b and an eighth sipe 91c. Seventh sipe 91b presents two elbow shaped portions and it connects two end portions 62 of two axially adjacent substantially transverse grooves 6. Sixth and eighth sipes 91a, 91c have only one elbow shaped portion. Preferably, the edge formed by third central transverse groove 56 and end portion 62 of substantially transverse groove 6 is chamfered.

According to the embodiment shown in FIGS. 2 and 2a, second equatorial block 92 is delimited by two intermediate portions of two axially adjacent transverse grooves 6 and by one first transverse equatorial groove 57 and one second transverse equatorial groove 58. Preferably, the four edges of second equatorial block 92 are chamfered.

According to the embodiment shown in FIGS. 2 and 2a, second equatorial block 92 comprises a plurality of sipes which are substantially transverse to the rolling direction. In details, second equatorial block 92 comprises: a ninth sipe 92a, a tenth sipe 92b and a eleventh sipe 92c. Tenth sipe 92b presents two elbow shaped portions and it connects two intermediate portions of two axially adjacent transverse grooves 6. Ninth and eleventh sipes 92a, 92c have only one elbow shaped portion.

Advantageously, since sipes 91a, 91b, 91c of first equatorial block 91 and sipes 92a, 92b, 92c of second equatorial block 92 have a substantially transverse extension, they suitably improve tractivity and braking performance of the tire of the present invention. Furthermore, said sipes contribute in decreasing the noise level of the tire during running thereof on asphalted roads.

Preferably, the main portions (i.e. excluding the elbow-shaped portions) of the sipes of first and second equatorial blocks 91, 92 are parallel to second portion 57b.

Profitably, the grooves belonging to the central region 5 have lateral walls asymmetrically inclined for reducing the possible entrapping of pebbles thereinto. Preferably, said lateral walls are inclined—with respect to a plane perpendicular to the tread band surface—of an angle comprised from about 0° to about 25°.

Figure 3:
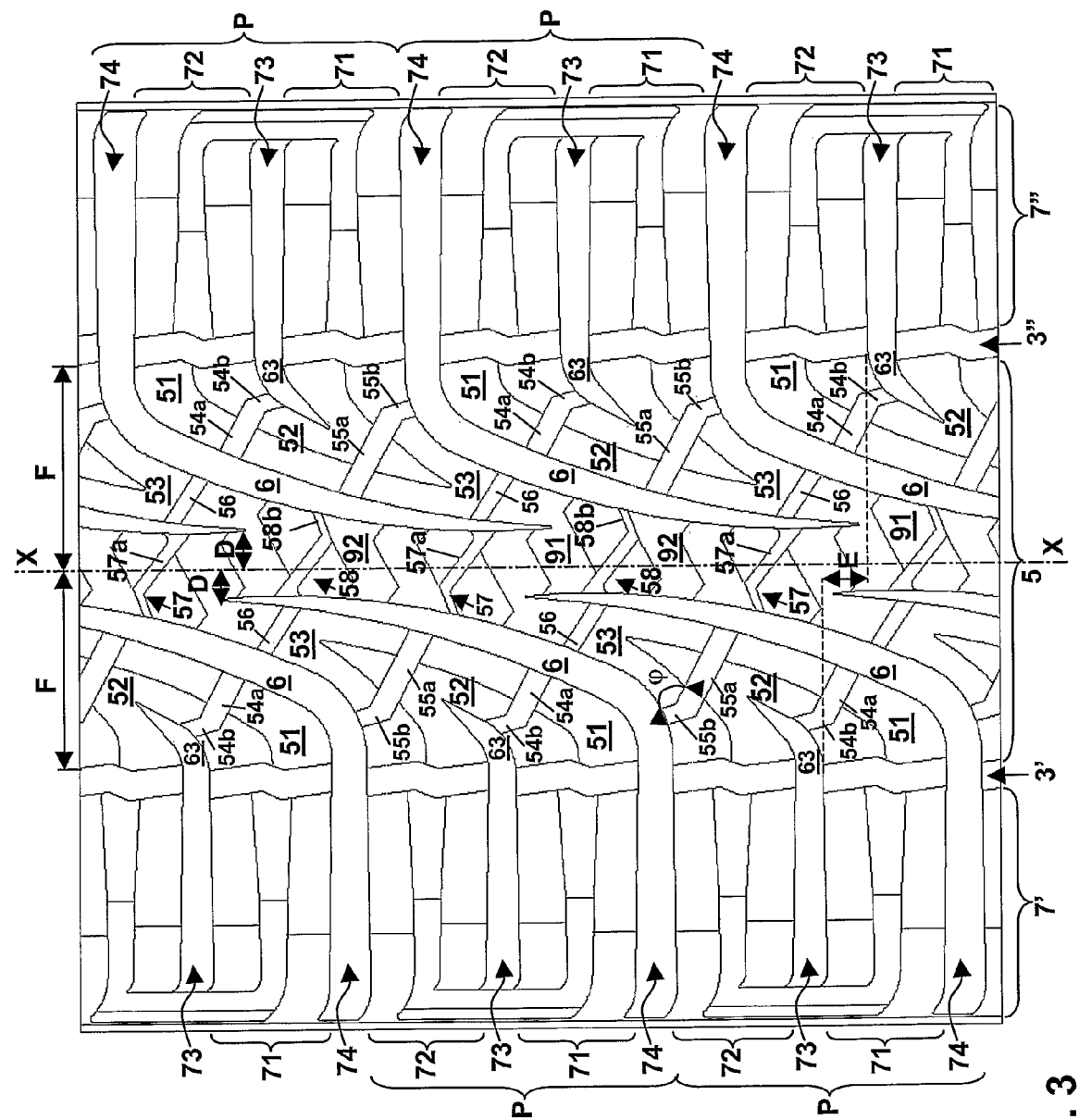
FIGS. 3 and 3a are plan views of a portion of a tread band of a tire in accordance with a second embodiment of the present invention.
Figure 3A:
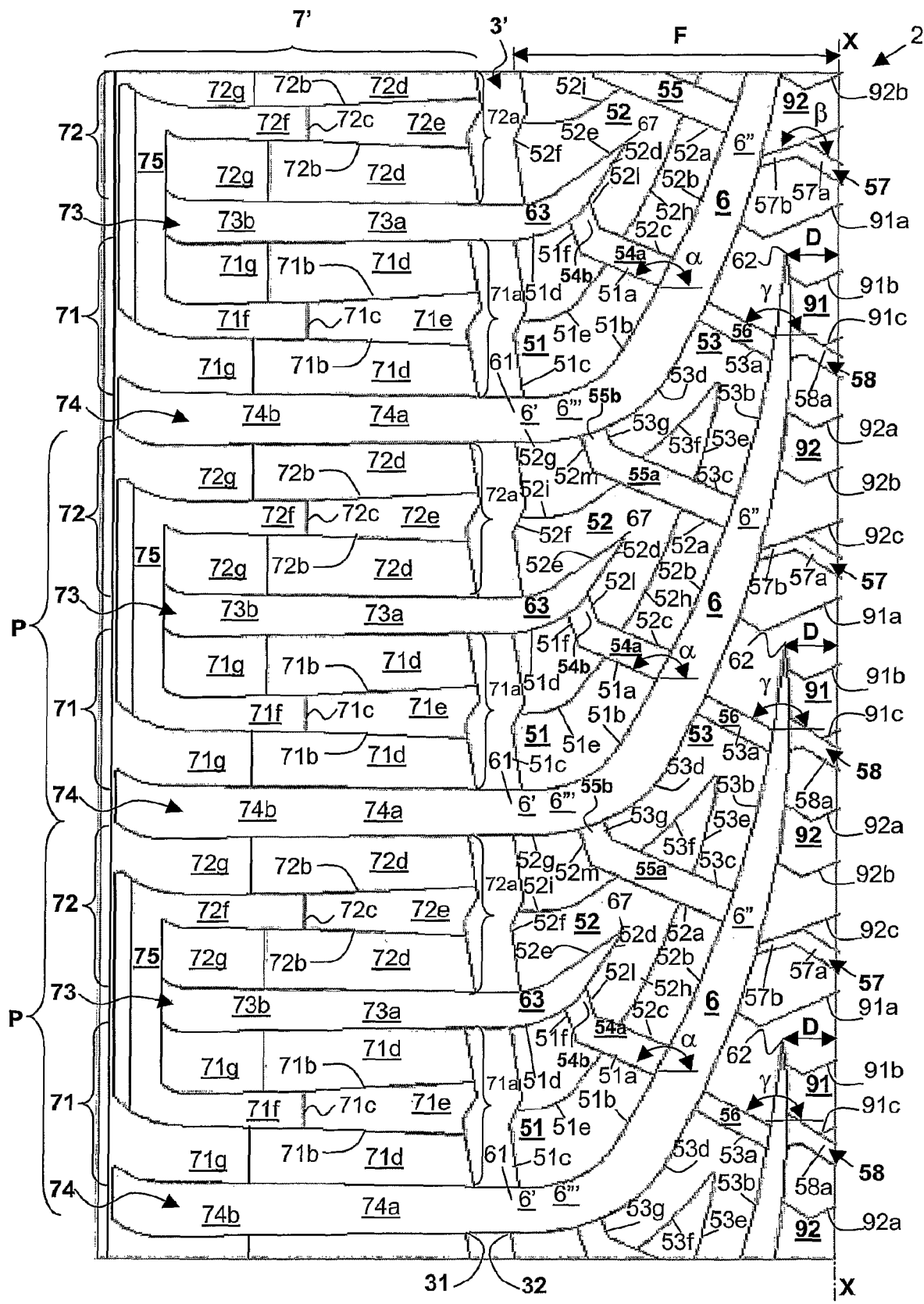

FIGS. 3 and 3a show a second embodiment of tread pattern 2 of the tire according to the present invention (FIG. 3a showing only the left side portion of pattern 2 of FIG. 3). In details, the tread pattern according to said second embodiment is similar to the tread pattern of the first embodiment, the only difference being the shape of first and second central transverse grooves 54, 55 and thus the corresponding shape of central blocks 51, 52 and 53 delimited between two circumferentially consecutive substantially transverse grooves 6. Therefore, only a detailed description of the tread elements of FIGS. 3 and 3a which differ from those of FIGS. 2 and 2a will be given hereinbelow.

First central transverse groove 54 according to the second embodiment shown in FIGS. 3 and 3a is elbow shaped. This means that first central transverse groove 54 comprises a first portion 54a and a second portion 54b which intersect to form the elbow shape. First portion 54a is inclined of an angle α. The first and second portions 54a, 54b form an angle φ ranging from about 120° to about 150°, preferably φ is about 135°. Preferably, first portion 54a is wider than second portion 54b. Preferably, the width of first portion 54a is comprised from about 5.0 mm to about 10.0 mm. Preferably, the depth of first portion 54a is comprised from about 8.0 mm to about 15.0 mm. Preferably, the width of second portion 54b is comprised from about 2.0 mm to about 6.0 mm. Preferably, the depth of second portion 54b is comprised from about 8.0 mm to about 15.0 mm.

Similarly to first central transverse groove 54, second central transverse groove 55 according to the second embodiment of the tread pattern of the present invention is elbow shaped. In other words, as shown in FIGS. 3 and 3a, second central transverse groove 55 comprises a first portion 55a and a second portion 55b. Preferably, first portion 55a of second central transverse groove 55 is parallel to the corresponding first portion 54a belonging to the same central area, i.e. belonging to the same pitch P. Preferably, second portion 55b of second central transverse groove 55 is parallel to the corresponding second portion 54b belonging to the same central area, i.e. belonging to the same pitch P. Preferably, first portion 55a is wider than second portion 55b. Preferably, the width of first portion 55a is comprised from about 5.0 mm to about 10.0 mm. Preferably, the depth of first portion 55a is comprised from about 8.0 mm to about 15.0 mm. Preferably, the width of second portion 55b is comprised from about 2.0 mm to about 6.0 mm. Preferably, the depth of second portion 55b is comprised from about 8.0 mm to about 15.0 mm.

Due to the elbow shape of first and second central transverse grooves 54, 55 of the second embodiment of the present invention, first, second and third central blocks 51, 52, 53 have shapes which are different from the shapes of the corresponding central blocks of the first embodiment shown in FIGS. 2 and 2a. In particular, first central block 51 of FIG. 3a is provided with an additional side 51f positioned between sides 51d and 51a. Preferably, the intersection between sides 51d and 51f and the intersection between sides 51a and 51b is chamfered.

Second central block 52 of FIGS. 3 and 3a is provided with an additional side 52l positioned between sides 52c and 52d and a further additional side 52m positioned between sides 52g and 52a Preferably, the intersection between sides 52e and 52f are chamfered.

Finally, third central block 53 of FIGS. 3 and 3a is provided with an additional side 53g positioned between sides 53c and 53d.

The Applicant has found that elbow-shaped first and second central transverse grooves 54, 55 advantageously contribute in reducing the noise level of the tread. This is principally due to the fact that a first/second central transverse groove of the tread left side will not enter into the tire footprint area simultaneously with a corresponding first/second central transverse groove of the tread right side.

Figure 4:
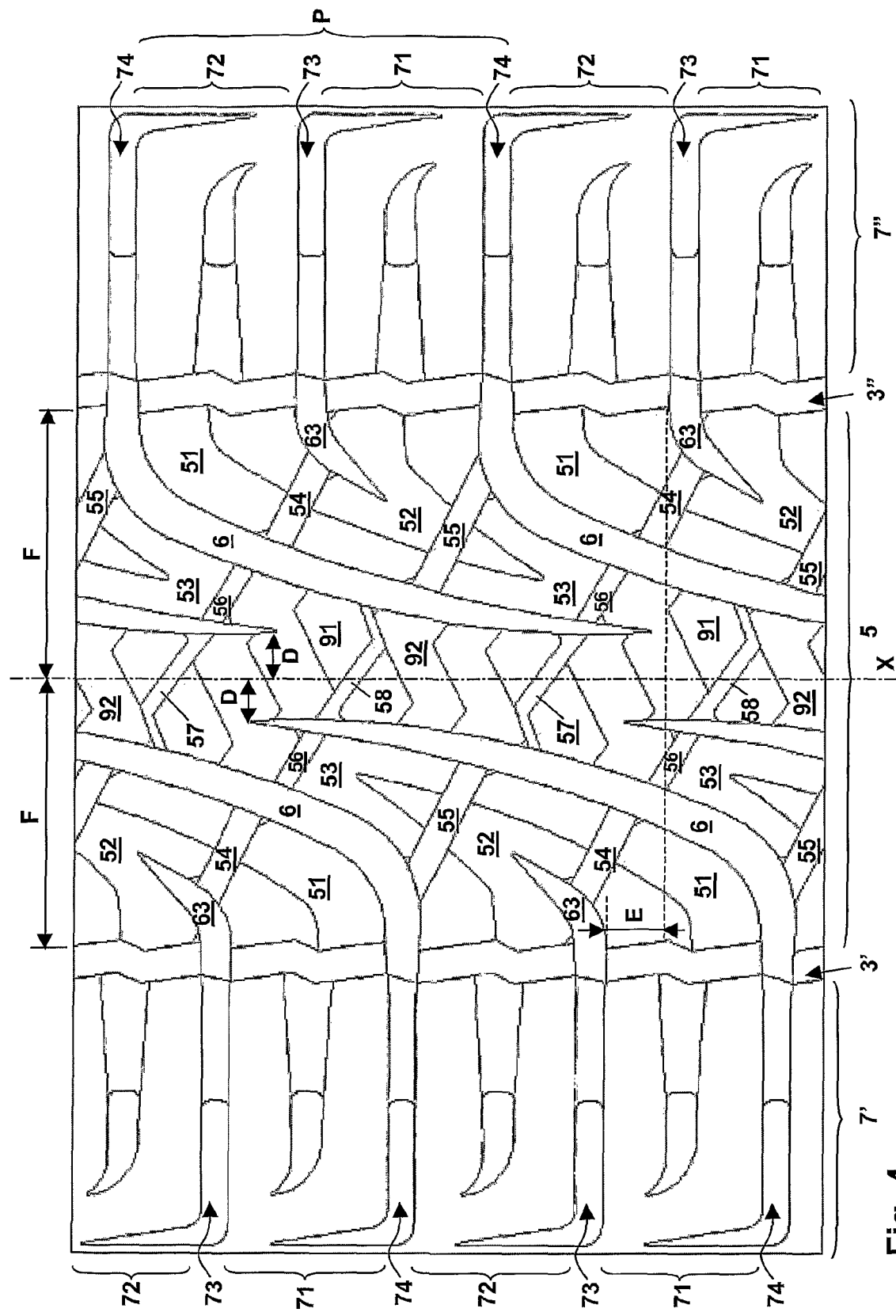
FIGS. 4 and 4a are plan views of a portion of a tread band of a tire in accordance with a third embodiment of the present invention.
Figure 4A:
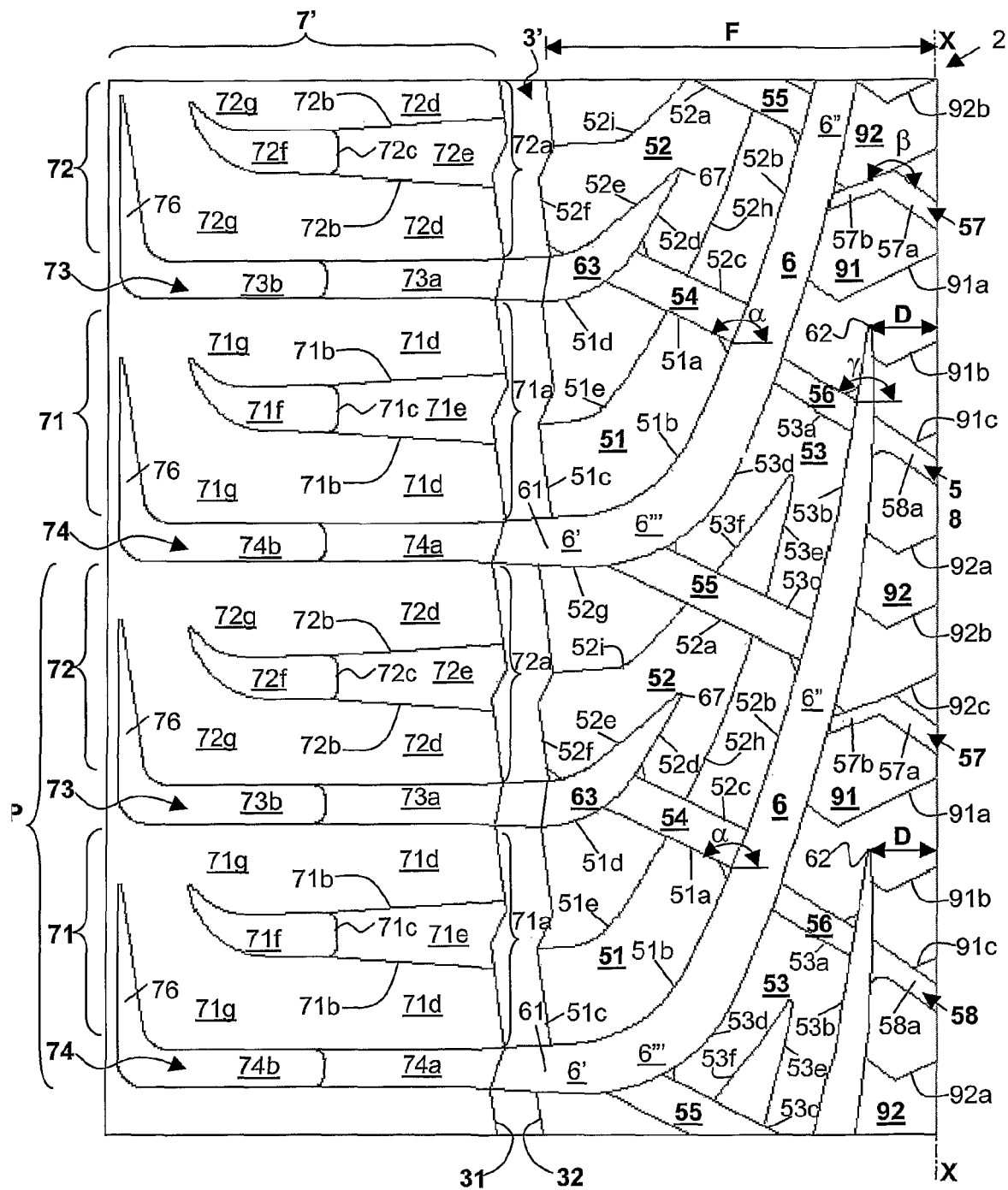

FIGS. 4 and 4a show tread pattern 2 according to a third embodiment of the present invention said embodiment being similar to the first embodiment shown in FIGS. 2 and 2a. In fact, the only difference between the two embodiments lies in the shape of the shoulder blocks. Therefore, only a detailed description thereof will be given hereinbelow.

First shoulder block 71 comprises portions 71e, 71d and 71g. In FIG. 4a reference number 71f denotes a first transverse groove which is positioned between two circumferentially consecutive block projections 71g. Preferably, first transverse groove 71f is a nail-shaped groove.

According to the embodiment shown in FIGS. 4 and 4a, in correspondence of the outermost (with respect to the tire equatorial plane) ends of the shoulder region 7', shoulder transverse grooves 73, 74 are provided with a blind extended portion 76 which is inclined in a substantially circumferential direction. Extended portions 76 confer to shoulder transverse grooves 73, 74 a L shape, the base of which (i.e. extended portion 76) projects substantially in the same longitudinal direction as end portions 62 of the substantially transverse grooves 6. Extended portion 76, similarly to connecting groove 75 of the first embodiment shown in FIGS. 2 and 2a, provides an advantageous "toothed wheel effect" resulting in an additional mechanical traction, especially during running in hard off-road conditions. Since extended portion 76 is a blind groove, the width thereof decreases towards its end portion. Preferably, the depth of extended portion 76 decreases towards the end portion thereof.

Preferably, shoulder transverse groove 73 comprise a first portion 73a, having a first depth, and a second portion 73b, having a second depth. First portion 73a and second portion 73b are axially adjacent to each other. Preferably, the second depth is greater than the first depth. Preferably, said first portion 73a and second portion 73b have substantially equal axial extension.

Similarly, preferably shoulder transverse groove 74 comprises a first portion 74a, having a first depth, and a second portion 74b, having a second depth. First portion 74a and second portion 74b are axially adjacent to each other. Preferably, the second depth is greater than the first depth. Preferably, said first portion 74a and second portion 74b have substantially equal axial extension.

Figure 5:
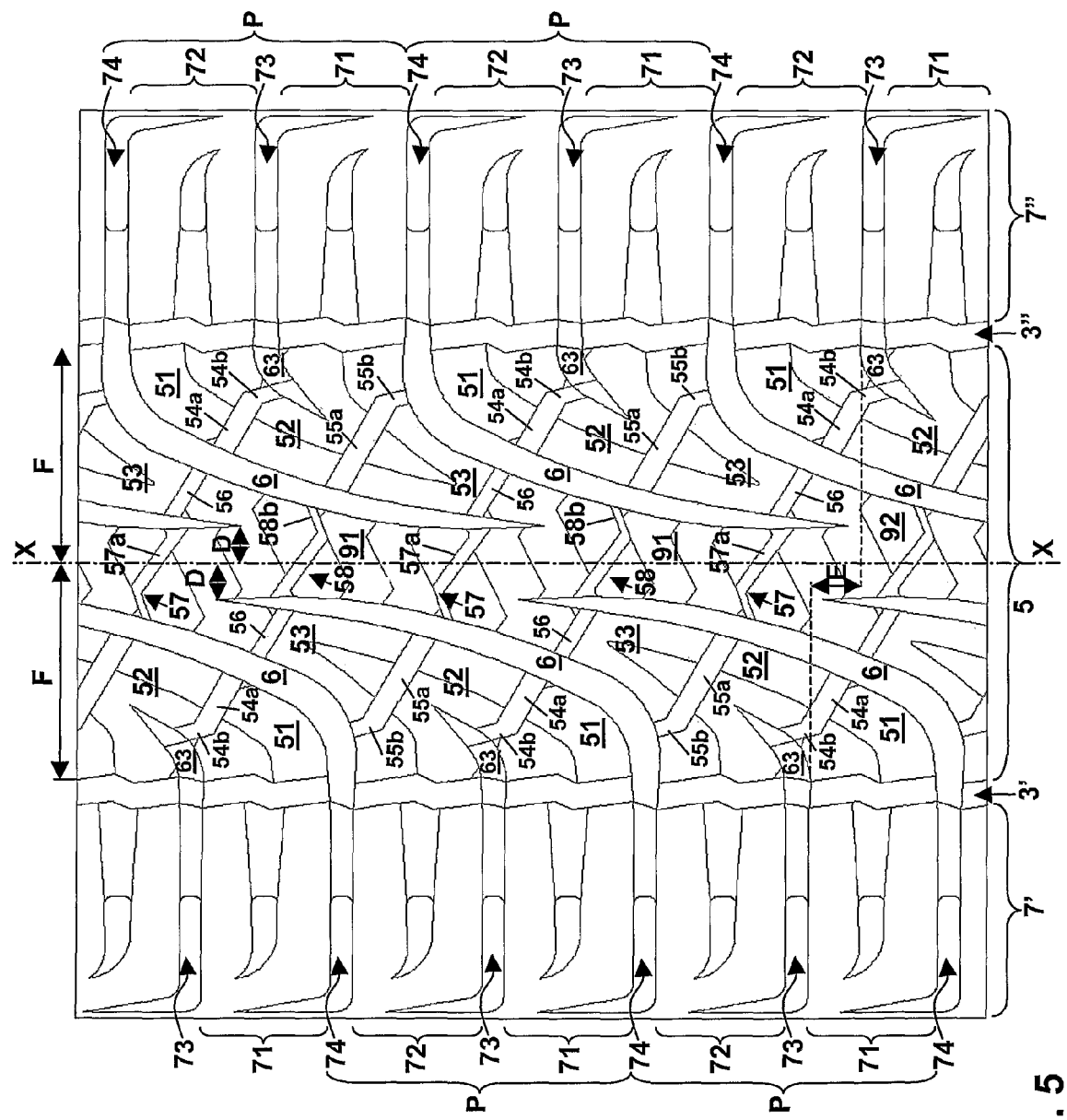
FIGS. 5 and 5a are plan views of a portion of a tread band of a tire in accordance with a fourth embodiment of the present invention.
Figure 5A:
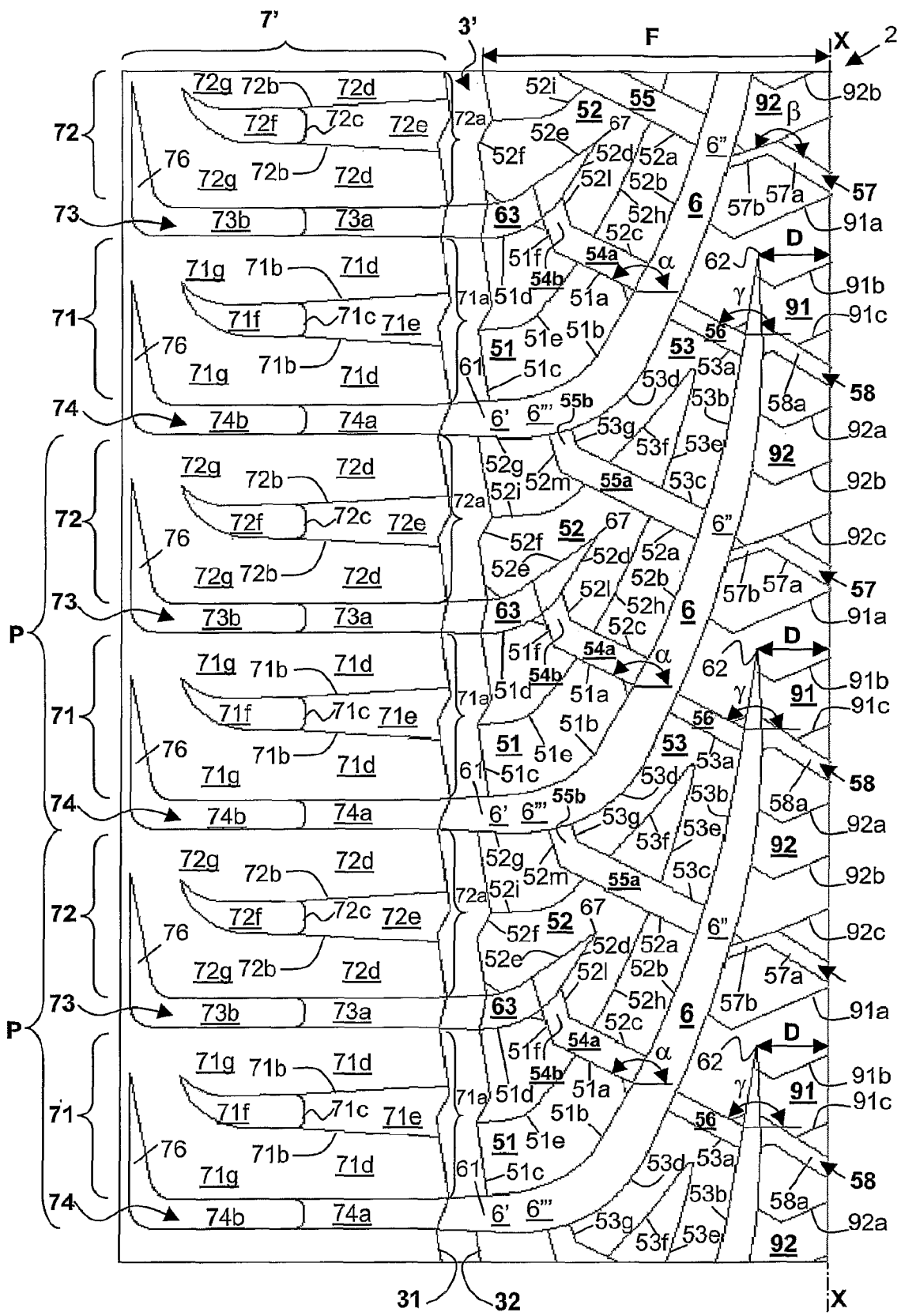

FIGS. 5 and 5a show a fourth embodiment of tread 2 of the present invention. The shoulder regions 7', 7" of the fourth embodiment correspond to shoulder regions 7', 7" of third embodiment (FIGS. 4 and 4a) and they will not be described in further details. The central region 5 of the fourth embodiment corresponds to central region 5 of the second embodiment (FIGS. 3 and 3a) and it will not be described in further details.

Figure 6:
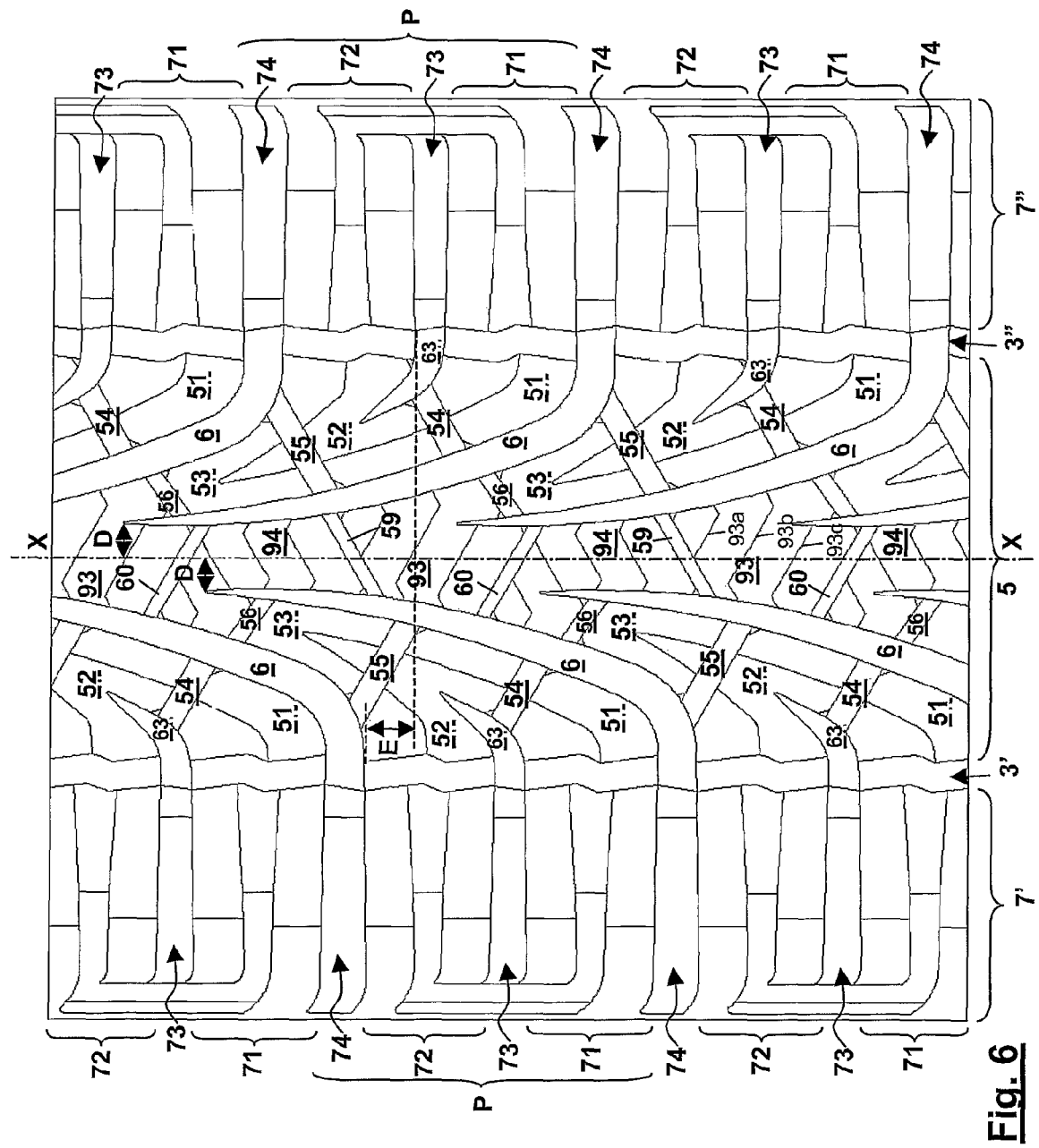
FIGS. 6 and 6a are plan views of a portion of a tread band of a tire in accordance with a fifth embodiment of the present invention.
Figure 6A:
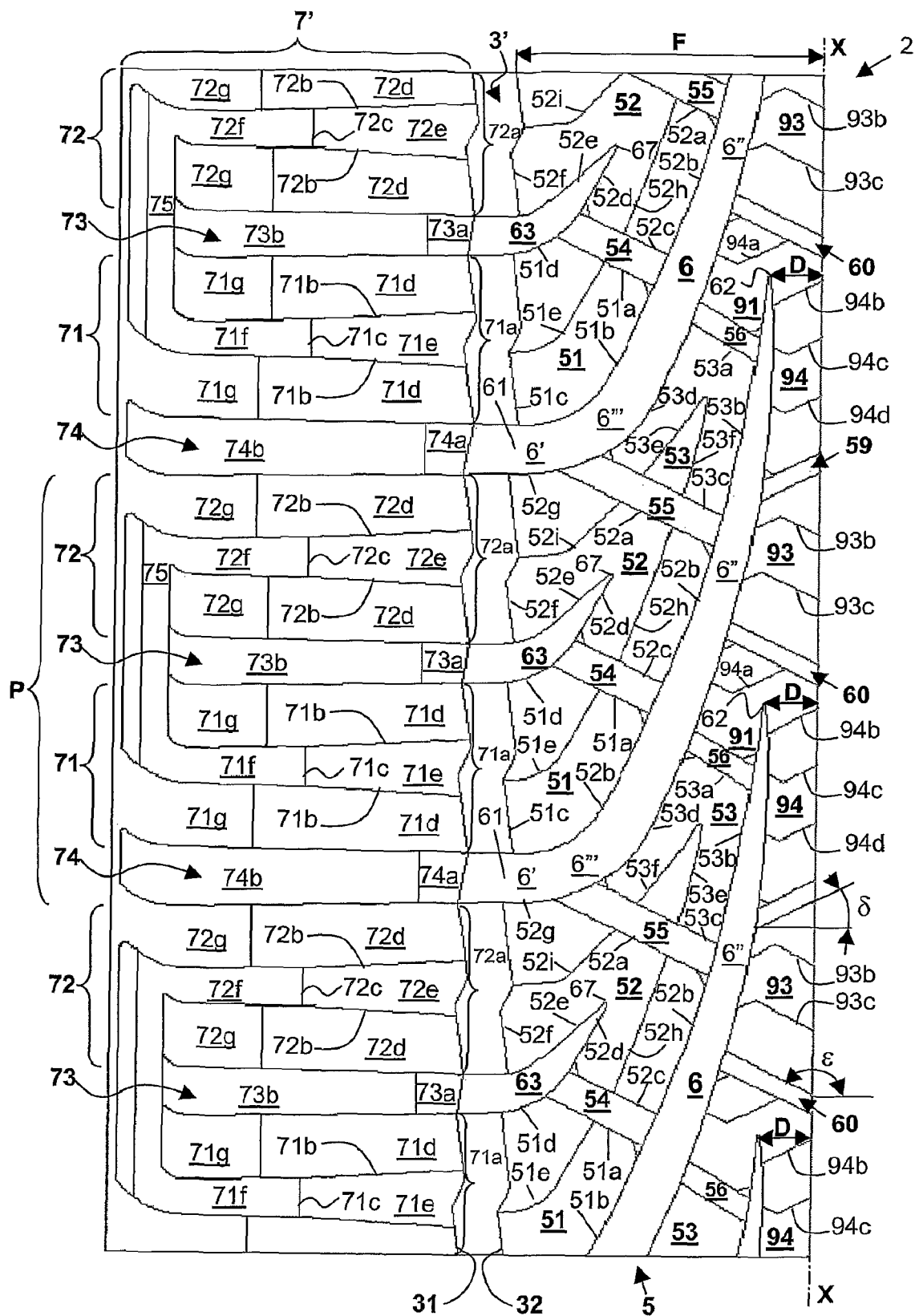

FIGS. 6 and 6a show a fifth embodiment of tread 2 of the present invention. The tread of FIGS. 6 and 6a is of the directional type. This means that the shoulder region as well as the central region delimited by substantially transverse-grooves 6 in the left side of the tread pattern are a mirror image (with respect to the tire equatorial plane) of the shoulder region and the central region, respectively, of the right side of the tire tread. Preferably the left side of the tire tread is circumferentially staggered by a distance E which is between about 10% and about 40%, and preferably about 25%, of the distance between the circumferential groove 3' and the equatorial plane X-X. Since the shoulder regions and the blocked area defined between circumferentially consecutive transverse grooves 6 are identical to those of FIGS. 2 and 2a and have, been described in detail hereinabove with reference to said Figures, the detailed description which follows is only directed to the substantially continuous rib which extends astride the fire equatorial plane.

According to fifth embodiment the substantially continuous rib axially extends between the circumferentially consecutive transverse grooves 6 of the tread left side and the circumferentially consecutive transverse grooves 6 of the tread right side, and comprises a plurality of third equatorial blocks 93 and fourth equatorial blocks 94 that are arranged in circumferential succession. Preferably, the substantially continuous rib is obtained by circumferentially and consecutively alternating a third equatorial block 93 and a fourth equatorial block 94, said blocks being separated from each other by transverse equatorial grooves as described in details in the following of the present description.

According to the embodiment shown in FIGS. 6 and 6a, third equatorial block 93 is penetrated by end portion 62 of a transverse groove 6 belonging to the tread right side.

According to said embodiment, third equatorial block 93 is delimited by: 1) one third central transverse groove 56, which belongs to the tread right side and defines a portion of a first transverse edge of said block; 2) two intermediate portions of axially adjacent transverse grooves 6, said intermediate portions defining the substantially longitudinal edges of said block; 3) a third transverse equatorial groove 59 which defines a second transverse edge of said block, and 4) a fourth transverse equatorial groove 60 which defines the remaining portion of the first transverse edge of said block.

Third transverse equatorial-groove 59 connects intermediate portions of two opposite substantially transverse grooves 6, i.e. of a transverse groove 6 belonging to the left side of the tire tread pattern and of a transverse groove 6 belonging to the right side of the tire tread pattern. Third transverse equatorial groove 59 is inclined of an angle $\delta$, with respect to a radial plane. Preferably, angle $\delta$ is comprised from about 10° to about 50°. Preferably, third transverse equatorial groove 59 is parallel to second central transverse groove 55 belonging to the right side of the pattern. Preferably the width of third transverse equatorial groove 59 is comprised from about 3.0 mm to about 6.0 mm. Preferably, the depth of third transverse equatorial groove 59 is comprised from about 8.0 mm to about 15.0 mm.

Similarly to third equatorial block 93, fourth equatorial block 94 is penetrated by end portion 62 of a substantially transverse groove 6 belonging to the tread left side.

According to said embodiment, fourth equatorial block 94 is delimited by: 1) one third central transverse groove 56, which belongs to the tread left side and defines a portion of a first transverse edge of said block; 2) two intermediate portions of axially adjacent transverse grooves 6, said intermediate portions defining the substantially longitudinal edges of said block; 3) a third transverse equatorial groove 59 which defines the remaining portion of said first transverse edge of said block, and 4) a fourth transverse equatorial groove 60 which defines a second transverse edge of said block.

Fourth transverse equatorial groove 60 connects an intermediate portion of a transverse groove 6 and an end portion 62 of a corresponding-axially adjacent transverse groove 6. Fourth transverse equatorial groove 60 is inclined of an angle $\epsilon$, with respect to a radial plane. Preferably, angle $\epsilon$ is comprised from about 130° to about 170°. Preferably, fourth transverse equatorial groove 60 is parallel to first central transverse groove 54 belonging to the left side of the pattern. Preferably, the width of fourth transverse equatorial groove 60 is comprised from about 2.0 mm to about 6.0. Preferably, the depth of fourth transverse equatorial groove 60 is comprised from about 8.0 mm to about 15.0.

According to the embodiment shown in FIGS. 6 and 6a, third equatorial block 93 comprises a plurality of sipes which are substantially transverse to the rolling direction. In details, third equatorial block 93 comprises: a twelfth sipe 93a, a thirteenth sipe 93b and a fourteenth sipe 93c. Twelfth sipe 93a and fourteenth sipe 93c have only one elbow shaped portion, while thirteenth sipe 93b presents two elbow shaped portions. Preferably, sipes 93a-c are substantially parallel to fourth equatorial groove 60. Two sharp angles of third equatorial block 93 are preferably chamfered for avoiding premature damage of the tread during use.

Similarly to third equatorial block 93, fourth equatorial block 94 comprises a plurality of sipes which are substantially transverse to the rolling direction. In details, fourth equatorial block 94 comprises: a fifteenth sipe 94a, a sixteenth sipe 94b, a seventeenth sipe 94c and a eighteenth sipe 94d. Preferably, as it is shown in FIG. 6, fifteenth sipe 94a has only one elbow shaped portion. Preferably, sixteenth sipe 94b is rectilinear. Preferably, seventeenth sipe 94c and eighteenth sipe 94d present two elbow shaped portions. Preferably, sipes 94a-94d of fourth equatorial block 94 are substantially parallel to third equatorial groove 59. Two sharp angles of fourth equatorial block 94 are preferably chamfered for avoiding premature damage of the tread during use.

According to a further embodiment (not shown in the figures), the directional tire shown in FIGS. 6 and 6*a* is provided with shoulder regions as described with reference to FIGS. 4 and 4*a*.

According to a further embodiment (not shown in the figures), first and second central transverse grooves 54, 55 of the directional tire shown in FIGS. 6 and 6*a* are elbow-shaped grooves as those shown in FIGS. 3, 3*a*, 5 and 5*a*.

According to a further embodiment (not shown in the figures), the directional tire shown in FIGS. 6 and 6*a* is provided with shoulder regions as described with reference to FIGS. 4 and 4*a* as well as with elbow-shaped central transverse grooves 54, 55 as those shown in FIGS. 3, 3*a*, 5 and 5*a*.

On-road and off-road performance of tires of the present invention were evaluated and compared with the best all terrain tires present on the market.

The performance of the tire of the present invention: (tire A), having the tread pattern shown in FIGS. 2 and 2*a*, was tested and compared with the best off-road tire produced by the Applicant (tire B) and the best off-road competitor's tire (tire C) present on the market.

A car, model "Ford F250 4×4", was first equipped with four tires according to the invention (tire A) and then with four comparative tires B and with four comparative tires C. The tires according to the present invention had a size of LT 265/75R16 and were mounted on 16X7J rims. The inflation pressure was about 45 psi for the front wheels and about 55 psi for the rear wheels. The comparative tires had the same structure, size and inflation pressure of the tires of the invention.

Handling tests in dry surface conditions (Dry Handling) and in wet surface conditions (Wet Handling) were carried out. In order to evaluate the tire behavior in said different conditions, the test driver simulated some characteristic maneuvers (change of lane, entering a bend, leaving a bend, for example) carried out at constant speed, in acceleration and in deceleration. Then the test driver judged the fire behavior and assigned a score depending on the tire performance during said maneuvers.

Handling test is generally divided into two voices (soft handling and hard handling) depending on the type of maneuver carried out by the test driver. Soft handling test relates to the use of the tire under normal driving conditions, i.e. in conditions of normal speed and good transversal grip. On the contrary, hard handling test describes the behavior of the tire at the limit of adherence, i.e. under extreme driving conditions. In the latter case the test driver executes maneuvers which an average driver might be forced to carry out in the case of unforeseen and hazardous circumstances: sharp steering at high speed, sudden changing of lanes to avoid obstacles, sudden braking, and the like.

As far as soft handling test was, concerned, the test driver assessed: the center feel, that is the delay and the degree of response of the vehicle to small steering angles; promptness of response to the steering traveling in a bend; progressiveness of response to the steering traveling in a bend; centering in a bend, that is the tire capacity to keep the vehicle on a bend with a constant radius without continuous steering corrections; realignment, that is the capacity of the tire to allow the vehicle to return to a rectilinear trajectory at the exit of a bend with contained and dampened transverse oscillations.

As far as hard handling test was concerned, the test driver assessed: force on the steering wheel when turning violently; promptness of insertion, that is the behavior of the tire in transition at the entrance of the bend taken at the limit speed; balance, that is the degree of over-steering or under-steering of the vehicle; yield, that is the tire capacity to absorb a strong fast transfer of the load as a consequence of a sudden change of lane without excessive deformation, and therefore without compromising vehicle stability and controllability; release in a bend, that is the tire capacity to minimize the effects of instability resulting from the sudden release of the accelerator during a bend taken at the limit speed; controllability, that is the tire capacity to maintain and/or return the vehicle to the trajectory after the loss of adherence.

Handling tests on sandy surfaces, muddy surfaces and grassy surfaces were also carried out.

The braking test was carried out along a straight section of asphalt both in dry and wet conditions, recording the stopping distance from a predefined initial speed, typically 100 km/h in dry conditions and 80 km/h in wet conditions. The stopping distance is determined as the mathematical average of a series of successive recorded values.

Aquaplaning test was carried out along straight road sections and around bends. Aquaplaning test along straight road sections was carried out along a straight section of smooth asphalt, of predefined length (100 m), with a layer of water of predefined constant height (7 mm) which was automatically restored after each test vehicle had passed by. The vehicle entered at a constant speed (approximately 100 km/h) in conditions of perfect grip and accelerated until the conditions of total loss of grip occurred.

Aquaplaning test around bends was carried out along a road section with smooth and dry asphalt, around a bend with a constant radius (100 m), having a predefined length and comprising, along a final section, a zone of predefined length (20 m) flooded with a layer of water of predefined thickness (6 mm). The test was carried out at a constant speed for different speed values.

Groove wander test was carried out along a straight section of an concrete road provided with longitudinal grooves of predetermined width and depth. The test driver assessed the response of the vehicle to small steering angles in order to verify at which extent the vehicle behaviour was influenced by the grooved road surface. This test is subjective and the test driver judged the tire behavior by assigning a score depending on the tire performance during said maneuvers.

Outdoor noise test was carried out along a straight section equipped with microphones. According to said test, the car entered the section at a predefined speed of entry, after which the engine was switched off and the noise outside the car in neutral gear was measured.

A mileage yield test was carried out along a predetermined test circuit and according to, specific driving conditions (e.g. at given speed and acceleration conditions). The test aimed at detecting and monitoring—at predetermined kilometric distances—both the entity and the regularity of the tread wear.

Table 1 sums up the test driver's scores for the tire of the invention (tire A) with respect to the comparative tire C, said values having been expressed as a percentage versus the values of the comparative tire B fixed at 100. Thus, values higher than 100 indicate an improvement with respect to the comparative tire B.

As it can be inferred from Table 1, the car equipped with tires according to the present invention resulted in very good performance in all the voices shown in the table.

TABLE 1

| Evaluated tire performance | Tire A (invention) | Tire B (comparative) | Tire C (comparative) |
|---|---|---|---|
| Wet Handling | 100 | 100 | 75 |
| Dry Handling | 100 | 100 | 100 |

TABLE 1-continued

| Evaluated tire performance | Tire A (invention) | Tire B (comparative) | Tire C (comparative) |
|---|---|---|---|
| Handling on sandy surfaces | 110 | 100 | 90 |
| Handling on muddy surfaces | 105 | 100 | 105 |
| Handling on grassy surfaces | 105 | 100 | 105 |
| Aquaplaning | 110 | 100 | 90 |
| Wet Braking | 100 | 100 | 100 |
| Dry Braking | 100 | 100 | 100 |
| Groove Wander | passed | passed | passed |
| Outdoor Noise | 110 | 100 | 90 |
| Mileage yield | 130 | 100 | 120 |

The invention claimed is:

1. A tire for a motor vehicle comprising a tread, said tread comprising a first and a second circumferential grooves which separate a central region from a first and a second shoulder regions, wherein:
   a) the first shoulder region comprises a plurality of shoulder blocks that are circumferentially separated by shoulder transverse grooves;
   b) said central region comprises a plurality of substantially transverse grooves extending from said first circumferential groove toward an equatorial plane of the tire, wherein two circumferentially consecutive substantially transverse grooves delimit a central area comprising:
      a first central block having one side forming a part of a wall of said first circumferential groove;
      a second central block circumferentially consecutive to said first central block, having one side forming a part of said wall of said first circumferential groove; and
      a third central block circumferentially shifted with respect to said first central block and positioned at a distance from said first circumferential groove, said third central block being separated from said second central block by a central transverse groove which is inclined with respect to the tire equatorial plane; and
   c) said substantially transverse grooves have respective end portions at a distance from the tire equatorial plane,
   wherein said central area comprises a further central transverse groove between said first central block and said second central block, and
   wherein said further central transverse groove is parallel to said central transverse groove.

2. The tire according to claim 1, wherein said central transverse groove forms an angle with respect to a radial plane, which is greater than 90° and lower than 180°.

3. The tire according to claim 2, wherein said angle is about 130° to about 170°.

4. The tire according to claim 1, wherein said central transverse groove is substantially straight.

5. The tire according to claim 1, wherein one side of said second central block forms a lateral wall of said central transverse groove.

6. The tire according to claim 5, wherein one side of said third central block forms a further opposite lateral wall of said central transverse groove.

7. The tire according to claim 1, wherein said central transverse groove is elbow shaped.

8. The tire according to claim 7, wherein two sides of said second central block form a lateral wall of said central transverse groove.

9. The tire according to claim 8, wherein two sides of said third central block form a further opposite lateral wall of said central transverse groove.

10. The tire according to claim 1, wherein said further central transverse groove is substantially straight.

11. The tire according to claim 1, wherein one side of said first central block forms a lateral wall of said further central transverse groove.

12. The tire according to claim 11, wherein one side of said second central block forms a further opposite lateral wall of said further central transverse groove.

13. The tire according to claim 1, wherein said further central transverse groove is elbow shaped.

14. The tire according to claim 13, wherein two sides of said first central block form a lateral wall of said further central transverse groove.

15. The tire according to claim 14, wherein two sides of said second central block form a further opposite lateral wall of said further central transverse groove.

16. The tire according to claim 1, wherein said central area comprises a third central transverse groove.

17. The tire according to claim 1, wherein one side of said third central block forms a lateral wall of said third central transverse groove.

18. The tire according to claim 1, wherein said substantially transverse grooves comprise a first end portion in correspondence with said first circumferential groove.

19. The tire according to claim 18, wherein said substantially transverse grooves comprise a second end portion at a distance from said equatorial plane.

20. The tire according to claim 19, wherein said substantially transverse grooves, in correspondence of said second end portion, are substantially tangent to a plane parallel to said equatorial plane.

21. The tire according to claim 19, wherein said substantially transverse grooves have a width decreasing from the first end portion toward the second end portion.

22. The tire according to claim 19, wherein said substantially transverse grooves have a depth decreasing from the first end portion toward the second end portion.

23. The tire according to claim 1, wherein said central area comprises a further substantially transverse groove at least partially penetrating into said second central block.

24. The tire according to claim 23, wherein said further substantially transverse groove has a depth decreasing toward the equatorial plane.

25. The tire according to claim 23, wherein said further substantially transverse groove has a width decreasing toward the equatorial plane.

26. The tire according to claim 23, wherein the further substantially transverse grooves are substantially axially aligned with corresponding shoulder transverse grooves.

27. The tire according to claim 1, wherein the central region comprises a plurality of first equatorial blocks and second equatorial blocks, said first and second equatorial blocks being arranged in circumferential succession substantially in proximity of the equatorial plane.

28. The tire according to claim 27, wherein the central region comprises first and second transverse equatorial grooves for delimiting said first and second equatorial blocks.

29. The tire according to claim 28, wherein said first and second transverse equatorial grooves are elbow shaped.

30. The tire according to claim 1, wherein said first and second circumferential grooves have a zig-zag path.

31. The tire according to claim 1, wherein at least one of said shoulder transverse grooves comprises a first portion having a first depth and a second portion having a second depth, said second depth being greater than said first depth.

32. The tire according to claim 1, wherein the substantially transverse grooves are substantially axially aligned with corresponding shoulder transverse grooves.

33. The tire according to claim 1, wherein at least one groove belonging to said central region has lateral walls asymmetrically inclined.

34. The tire according to claim 1, further comprising at least one sipe in one or more of said first central block, said second central block, and said third central block.

* * * * *